US009873473B2

(12) United States Patent
Vogel

(10) Patent No.: US 9,873,473 B2
(45) Date of Patent: Jan. 23, 2018

(54) CYCLIST POWER LINK

(71) Applicant: ENVIROSHOWER PTY LTD, Bray Park (AU)

(72) Inventor: Jordan Walter George Vogel, Palm Beach (AU)

(73) Assignee: Enviroshower Pty Ltd, New South Wales (AU)

( * ) Notice: Subject to any disclaimer, the term of this patent is extended or adjusted under 35 U.S.C. 154(b) by 0 days.

(21) Appl. No.: 15/102,738

(22) PCT Filed: Feb. 18, 2014

(86) PCT No.: PCT/AU2014/000134
§ 371 (c)(1),
(2) Date: Jun. 8, 2016

(87) PCT Pub. No.: WO2015/085344
PCT Pub. Date: Jun. 18, 2015

(65) Prior Publication Data
US 2016/0311487 A1    Oct. 27, 2016

(30) Foreign Application Priority Data

Dec. 9, 2013    (AU) ................................ 2013904771

(51) Int. Cl.
*B62J 1/28*        (2006.01)
*B62J 99/00*       (2009.01)
(52) U.S. Cl.
CPC ................. *B62J 1/28* (2013.01); *B62J 99/00* (2013.01); *B62J 2099/0073* (2013.01)

(58) Field of Classification Search
CPC ....... B62J 1/28; B62J 99/00; B62J 2099/0073
See application file for complete search history.

(56) References Cited

U.S. PATENT DOCUMENTS 607,667 A * 7/1898 Thayer ....................... B62J 1/28
280/290
742,800 A * 10/1903 Patten ........................ B62J 1/28
280/290

(Continued)

FOREIGN PATENT DOCUMENTS

| BE | 483759 A | 7/1948 |
| CH | 110868 A | 7/1925 |

(Continued)

OTHER PUBLICATIONS

International Search Report and Written Opinion for related international application No. PCT/AU2014/000134, dated Mar. 24, 2014.

*Primary Examiner* — Kevin Hurley
*Assistant Examiner* — Marlon A Arce
(74) *Attorney, Agent, or Firm* — Procopio, Cory, Hargreaves & Savitch LLP

(57) ABSTRACT

An apparatus for connecting a rider to a bike comprises a belt with a link at the front to a coupling on the bike frame which coupling allows hands free release of the link from the frame. A strap connected to the belt at one end and to a cable at the other end which has a ball bearing attached which engages a mating recess in the coupling such that the rider can disengage the cable by moving her body forward of the coupling.

6 Claims, 2 Drawing Sheets

(56) References Cited

U.S. PATENT DOCUMENTS

| 4,161,328 A | * | 7/1979 | Efros | ............... | B62J 99/00 |
| | | | | | 280/221 |
| 2006/0125206 A1 | * | 6/2006 | Goto | ............... | A41D 13/018 |
| | | | | | 280/290 |
| 2006/0157957 A1 | * | 7/2006 | Bever | ............... | B62J 1/28 |
| | | | | | 280/290 |

FOREIGN PATENT DOCUMENTS

| DE | 19700008 A1 | 7/1998 |
| DE | 20010087 U1 | 2/2001 |
| GB | 110890 A | 11/1917 |

\* cited by examiner

CYCLIST POWER LINK

FIELD OF THE INVENTION

This invention relates to apparatus for connecting a rider to a bike to improve efficiency of pedaling whilst maintaining the safety of the rider.

BACKGROUND OF THE INVENTION

There are many patent documents which disclose attempts to improve a cyclist's pedal drive. For example U.S. Pat. No. 6,244,611 teaches a harness consisting of a waist belt with two side straps and a back strap attached and anchored to the bike frame below the seat. However this apparatus does little to increase pedal drive and is dangerous since it does not allow the rider to quickly and easily free herself and dismount to avoid injury.

U.S. Pat. No. 635,683 teaches a shoulder harness which has a back strap connecting the rider to the seat of the bike. DE 200 10087 U1 discloses a shoulder harness with a front strap extending from the rider's chest to a fixture on the bike frame. FR 879302 and WO2010003206 disclose a shoulder harness with both a back strap connecting the rider to the frame below the seat and a front strap similar to that in DE 200 10087 U1. All of these suffer the saline deficiencies as U.S. Pat. No. 6,244,611 above.

FR260727 discloses a belt which passes around the rider's back and under the front of the seat. This anchors the rider firmly to the seat and does little to improve pedal drive. Further it takes both hands for detachment which is a safety risk. The belt of FR 792852 has a front attachment to the frame of the bike as well as a rear attachment to beneath the seat but operates to keep the rider firmly in the seat and suffers the same disadvantages.

WO 2011088531 disclose a belt which extends around the small of the rider's back and connects to a hook fixed on the upper bar of the bike frame. Although this configuration improves pedal drive the length of the belt is not readily adjustable while riding and the hook presents a dangerous projection in the case of accident. The frame attachment device of the harness of GB110890 presents a similar danger.

US2009066055 teaches a harness with bungee cords around the rider's waist which attach by hooks to a chain which is secured to the frame of the bike by means of a U bolt The chain and hooks and U bolt present risk of injury to the rider and although a quick release escape mechanism is claimed it requires at least one hand operation.

OBJECT OF THE INVENTION

It is therefore an object of the present invention to provide apparatus for connecting a rider to a bike which improves pedal drive whilst maintaining safety of the rider or at least to provide an alternative to existing apparatus.

STATEMENT OF THE INVENTION

According to the present invention an apparatus for connecting a rider to a bike comprises a belt with a link at the front to a coupling on the bike frame which coupling allows hands free release of the link from the frame.

Preferably the link comprises a strap connected to the belt at one end and to a cable at the other end which cable has means for engaging the coupling which allows hands free release.

Preferably the cable has a ball bearing attached which engages a mating recess in the coupling such that the rider can disengage the cable by moving her body forward of the coupling.

Preferably the cable has a second intermediate ball bearing which can engage the mating recess in the coupling.

Preferably the coupling is attached to the bike frame by means of a single circular clamp.

Alternatively the coupling is formed integral to the bike frame.

Preferably the coupling has no sharp projections.

Preferably the belt is adjustable.

BRIEF DESCRIPTION OF THE DRAWINGS

An embodiment of the invention is now described by way of example only with reference to the accompanying drawings in which.

DETAILED DESCRIPTION OF THE INVENTION

Figure 1:
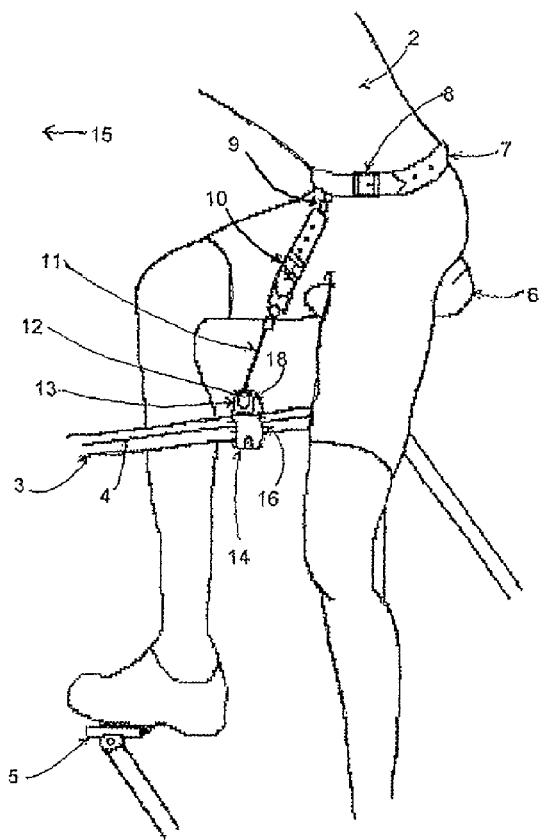
FIG. 1 shows a rider connected to a bike by an apparatus
Figure 4:
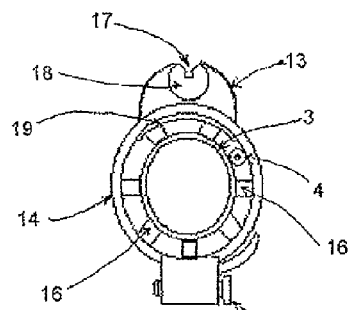
FIG. 4 is a front elevation of the coupling of FIG. 2 attached to the bike frame and FIG. 5 is a perspective view of the coupling of FIG. 2 by itself.
Figure 5:
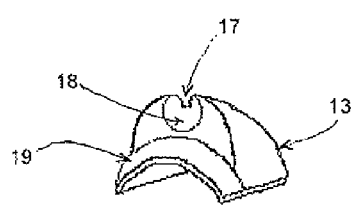
Figure 2:
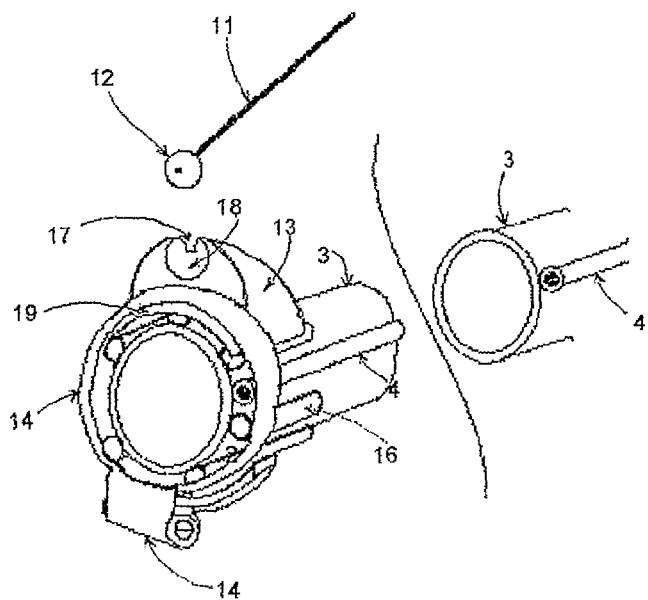
FIG. 2 is an enlargement of the bike frame coupling of FIG. 1
Figure 3:
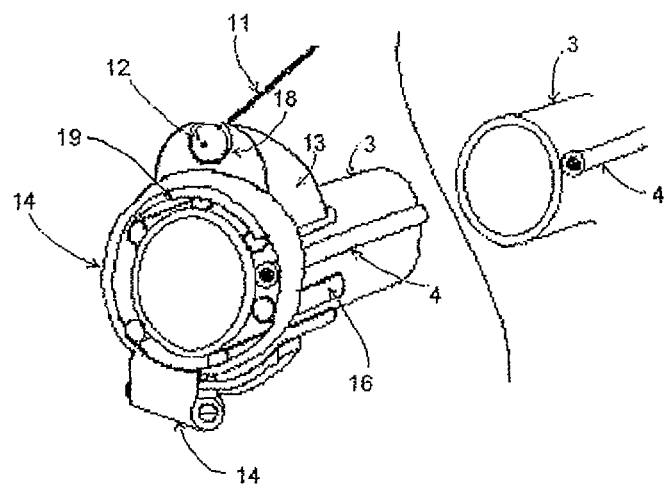
FIG. 3 shows the coupling of FIG. 2 with apparatus connected

Rider 2 in FIG. 1 is wearing belt 7 buckled at 8. One end of strap 10 is linked to the front of belt 7 at 9 and the other end to stainless steel cable 11. Stainless steel ball bearing 12 is fixed on the free end of cable 11 and engages mating recess 18 in coupling 13 mounted on frame 3 of the bike. Cable 11 passes through open slot 17 in coupling 13.

FIGS. 2 to 5 show coupling 13 mounted on frame 3 in detail. Coupling 13 is retained on frame 3 by single circular clamp 14 which passes over front 19 of coupling 13 with spacers 16 protecting brake and gear cables such as 4 running along frame 3. Ball bearing 12 nests in recess 18 with cable 11 passing through slot 17.

Accordingly when rider 2 rises from seat 6 to increase pedal 5 thrust, the apparatus anchors the small of the back of rider 2 to frame 3 allowing greater pedal 5 thrust than rider 2 can achieve with her weight alone. In fact cable 11 can be provided with a second intermediate ball bearing which allows closer coupling of rider 2 to bike frame 3 and hence even greater pedal 5 thrust for ascending steep climbs.

It will be noted that not only does the apparatus of the present invention allow variable connection of rider 2 to bike frame 3 but it does so while keeping rider 2 safe from injury. Rider 2 can disengage the apparatus from the bike simply by moving her body forward in direction 15 so that ball bearing 12 slides out of recess 18. This can be done while rider 2 keeps both hands on the handle bars. Further there are no sharp projections or chains which might cause injury in the event off an accident.

VARIATIONS

It will be realized that the foregoing has been given by way of illustrative example only and that all other modifications and variations as would be apparent to persons skilled in the art including mechanical equivalents are deemed to fall within the broad scope and ambit of the invention as herein set forth. For example, coupling 13 could be fixed to frame 3 by means alternative to clamp 14 and could of course be formed as an integral part of frame 3.

Throughout the description and claims of this specification the words "comprise" and variations of that word such as "comprises" and "comprising" are not intended to exclude other additives components integers or steps.

The invention claimed is:

1. An apparatus for connecting a rider to a bike comprising:
    a waist belt with a link at the front,
    a coupling capable of being mounted on a frame of a bike and having a mating recess,
    the link comprising a strap connected to the front of the belt at one end and to a cable at the other end, the cable has a ball bearing attached which engages the mating recess in the coupling,
    the coupling maintains a secure connection between the bike and the rider while pedaling but allows hands free release of the link from the frame while still pedaling, wherein the rider can disengage the cable from the coupling by moving the waist belt forward of the coupling enabling hands free release of the link from the frame while still pedaling.

2. The apparatus of claim 1 in which the cable has a second intermediate ball bearing which can engage the mating recess in the coupling for hill climbing such that the rider can disengage the cable by moving the belt forward of the coupling.

3. The apparatus of claim 1 in which the coupling is attached to the bike frame by means of a single circular clamp.

4. The apparatus of claim 1 in which the coupling is formed integral to the bike frame.

5. The apparatus of claim 1 in which the coupling has no sharp projections.

6. The apparatus of claim 1 in which the waist belt is adjustable.

* * * * *